(12) United States Patent
Swift et al.

(10) Patent No.: US 10,259,008 B1
(45) Date of Patent: Apr. 16, 2019

(54) METHODS OF REPAIRING WATER LEAKS IN AN APPARATUS

(75) Inventors: Philip Swift, Weston, FL (US); Alan Swift, Coral Springs, FL (US)

(73) Assignee: Swift Maintenance Products, Inc., Coral Springs, FL (US)

( * ) Notice: Subject to any disclaimer, the term of this patent is extended or adjusted under 35 U.S.C. 154(b) by 0 days.

(21) Appl. No.: 12/944,247

(22) Filed: Nov. 11, 2010

(51) Int. Cl.
   *B05D 3/00* (2006.01)
   *B05D 1/02* (2006.01)

(52) U.S. Cl.
   CPC ..................... *B05D 1/02* (2013.01)

(58) Field of Classification Search
   USPC ............ 427/140, 421.1, 427.3, 427.4, 427.5, 427/427.6, 427.7
   See application file for complete search history.

(56) References Cited

U.S. PATENT DOCUMENTS

| | | | | |
|---|---|---|---|---|
| 2,235,937 A * | 3/1941 | Linberg | ..................... | 264/36.15 |
| 2,979,416 A * | 4/1961 | Drexler | ..................... | C09D 5/34 |
| | | | | 427/140 |
| 4,101,483 A * | 7/1978 | Moskal | .................. | C09J 153/02 |
| | | | | 252/194 |
| 4,618,653 A * | 10/1986 | Kawakubo | .......... | C08F 283/004 |
| | | | | 525/254 |
| 4,994,307 A * | 2/1991 | Price et al. | .................. | 427/236 |

FOREIGN PATENT DOCUMENTS

JP             2004002540 A  *  1/2004

* cited by examiner

*Primary Examiner* — Dah-Wei D. Yuan
*Assistant Examiner* — Nga Leung V Law
(74) *Attorney, Agent, or Firm* — Banner & Witcoff, Ltd.

(57) ABSTRACT

Methods are provided for sealing air and water leaks in varied items. The methods provide for even application of a rubberized product that quickly and effectively cures to obtain a water- and air-tight seal.

5 Claims, 2 Drawing Sheets

Bird Bath

Water Tank (a)  vertical (b)  horizontal (c)  45°

(d)  clockwise-swirl (e)  counter-clockwise swirl

METHODS OF REPAIRING WATER LEAKS IN AN APPARATUS

BACKGROUND

Faced with an increasingly harsh economic environment, the consumer is surveying all expenses searching for ways to stretch income further. One undesirable expense is caused by the presence of holes and leaks in home and garden articles. Holes and leaks often mean that the item must be replaced, creating substantial increases in expenditure without any noticeable increase in standard of living.

Holes and leak arise from a variety of causes including anticipated, repeated use for which the article is designed, as well as exposure of the articles to the natural environment. Articles maintained in an outdoor environment all year are particularly prone to developing leaks and holes because they are exposed to the elements of all four seasons—winter, spring, summer and fall. The consecutive and cumulative exposure of the articles to sunlight, wind, rain and freezing conditions combines to create leaks and holes in even the sturdiest materials.

Options for repairing leaks are known in the art. For example, for flexible materials such as tarpaulins, patches may be applied using adhesives. Similarly, applying compositions containing polymers, copolymers, resins, and the like with and without curing agents is known in the art. See, for example, U.S. Pat. No. 4,300,614. Heavy-duty rubber aerosols are also known for temporary coatings. U.S. Pat. No. 7,520,553. Challenges remain however, in providing longer-lasting repairs without compromising the function of the original article.

Accordingly, there remains a need in the art for cost-effective methods of repairing leaks and holes in articles while retaining their sought-after properties.

SUMMARY

In one aspect, there is a method of repairing a leak on a water-holding apparatus comprising delivering a rubber composition to the apparatus horizontally across the region of the leak a first time using an aerosol delivery device, delivering the rubber composition to the article vertically across the region of the leak a first time using the aerosol delivery device, and curing the deposited rubber composition.

In another aspect, there is a method of patching a rip or tear in a flexible substrate, the patched substrate retaining flexibility, comprising steps of positioning the sections on the periphery of the tear adjacent to each other, depositing a rubber composition horizontally across the region of the tear one time using an aerosol delivery device, depositing a rubber composition vertically across the region of the tear one time using an aerosol delivery device, and curing the deposited rubber composition.

Another aspect includes an apparatus comprising a leak and a patch covering the leak wherein the patch comprises a rubber composition.

DETAILED DESCRIPTION

Repairing leaking articles extends their usefulness while minimizing replacement costs. Problems arise, however, when the utility of the article is at odds with the repair approach. Articles that hold water must be repaired in such a way that the leak does not interfere with the normal operation of the article.

The present methods are suitable for repairing leaks, holes, and tears on various types of articles that are exposed to water in their normal use. For example, the water-holding apparatus may be a sink, a fountain, a pond, a birdbath, a hot-tub, a bath-tub, a water-barrel, a boat, and a fish tank. Each of these apparatuses requires a water-fast repair. Accordingly in one approach, a rubber composition is applied in one direction and then in a second direction perpendicular to the first. Applying the second perpendicularly to the first provides even coating and robust coverage of the hole or tear.

For flexible substrates, such as car covers, boat covers, and pool covers the patched substrate retains flexibility thus avoiding any compromise in function. In some embodiments the covers are made of heavy plastic. In other embodiments, the covers are made of a lighter plastic. A first stage in repairing the flexible substrates is to align the material such that the repair does not introduce any pinching that could introduce strain by twisting the material.

In a second stage, the rubber composition is applied by spraying a first time horizontally across the rip or tear area followed by a second spraying at an angle perpendicular to the first. Optionally, the second layer may be omitted.

Typically, curing occurs by air-drying, which permits evaporation of solvents present in the rubber composition. As the solvents evaporate the rubber particles form a barrier that prevents water from leaking.

Heavy plastic substrates may tolerate additional applications without becoming warped due to the thickness of the deposited rubber. Accordingly, in some embodiments, additional coating may be applied. Additional coatings may be applied at different angles. For example, the coating may be applied at a 45 degree angle relative to the prior applications.

Figure 1:
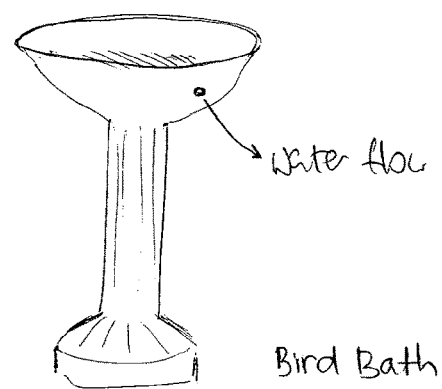
FIG. 1 shows exemplary apparatus such as a bird-bath and a water-tank.
Figure 1:
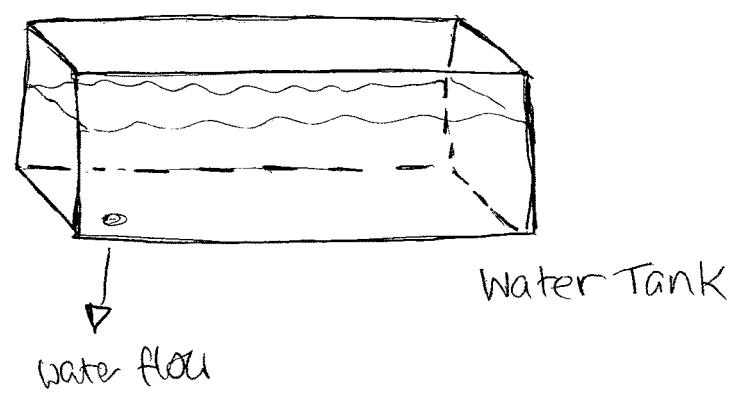
Figure 2:
FIG. 2 illustrates directional application of the rubberized compositions in (a) vertical application, (b) horizontal, (c) 45 degree angle application (d) clockwise swirl application, (e) anti-clockwise swirl application.
Figure 2:
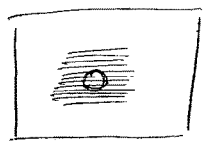
Figure 2:
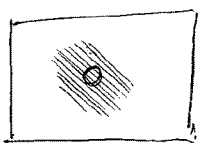
Figure 2:
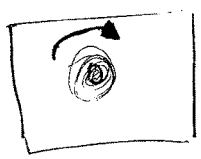
Figure 2:
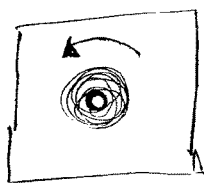

In some embodiments, the coating may be applied in a clockwise or anti-clockwise swirl pattern as shown in FIG. 2.

In addition to the water-holding apparatuses, the present methods may also be applied to insulate and sound proof outdoor electrical appliances. In a particularly preferred embodiment, the rubber composition is applied to insulate and seal speakers and sound systems and the like. Sealing with rubber minimizes potential electrical hazards following introduction of water to electrical devices.

Suitable rubber compositions are known in the art. Preferred rubber composition comprises a polymer, toluene, aliphatic petroleum distillate, a solvent, calcium carbonate, and carbon black. Liquified petroleum gas may be used to provide aerosolization to expel the rubber composition for application to the apparatuses.

Delivering the rubber compositions using the liquid petroleum gas also advantageously seals out water. A good bond with the substrate or apparatus is obtained, in part, due the hydrophobic nature of the solvents in the compositions which repels any water present on the substrate near the repair site.

By applying the rubber compositions as described above good seals are obtained that provide water-proofing that last for years without reducing the functioning of the original apparatus.

The contents of each of the above cited patents are hereby incorporated by reference as if set forth fully herein.

While particular embodiments have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A method of repairing a leak on a plastic substrate:
   a) applying a first layer of a rubber composition to the plastic substrate in a first direction across the region of the leak using liquefied petroleum gas to expel and aerosolize the composition from an aerosol delivery device,
   b) applying a second layer of the rubber composition to the plastic substrate in a second direction across the region of the leak using an aerosol delivery device, wherein the first direction and the second direction are perpendicular to each other, and
   c) curing the deposited rubber composition,
   wherein the rubber composition comprises toluene, aliphatic petroleum distillate, solvent, calcium carbonate, and carbon black.

2. The method of claim 1 further comprising a third application of the rubber composition perpendicular to the first direction.

3. The method of claim 1 further comprising a fourth application of the rubber composition perpendicular to the second direction.

4. The method of claim 1, wherein the plastic substrate is a water-holding apparatus.

5. The method of claim 4, wherein the water-holding apparatus is selected from the group consisting of a fountain, a pond, a birdbath, a hot-tub, a bath-tub, a boat, and a fish tank.

* * * * *

UNITED STATES PATENT AND TRADEMARK OFFICE
CERTIFICATE OF CORRECTION

PATENT NO. : 10,259,008 B1  
APPLICATION NO. : 12/944247  
DATED : April 16, 2019  
INVENTOR(S) : Philip Swift et al.

Page 1 of 1

It is certified that error appears in the above-identified patent and that said Letters Patent is hereby corrected as shown below:

On the Title Page

Item [73], delete "Swift Maintenance Products, Inc." and insert -- Swift IP, LLC --

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*